United States Patent [19]
Gerson et al.

[11] 3,970,364
[45] July 20, 1976

[54] DEPLETION LAYER LASER BEAM MODULATOR AND DEFLECTOR

[75] Inventors: Robert Gerson; Robert J. Bell, both of Rolla, Mo.

[73] Assignee: The Curators of the University of Missouri, Columbia, Mo.

[22] Filed: Aug. 20, 1974

[21] Appl. No.: 498,840

[52] U.S. Cl. .................... 350/160 R; 331/94.5 H; 350/96 WG; 357/23; 357/30
[51] Int. Cl.² ................... G02B 5/04; G02B 5/14; H01L 29/78
[58] Field of Search ............... 331/94.5 H, 94.5 M; 350/150, 160 R, 96 WG

[56] References Cited
UNITED STATES PATENTS

| | | | |
|---|---|---|---|
| 3,295,911 | 1/1967 | Ashkin et al. | 350/96 WG |
| 3,320,013 | 5/1967 | Johnson | 350/96 WG |
| 3,462,211 | 8/1969 | Nelson et al. | 350/96 WG |
| 3,614,198 | 10/1971 | Martin et al. | 350/96 WG |
| 3,656,836 | 4/1972 | de Cremoux et al. | 331/94.5 M |
| 3,748,597 | 7/1973 | Reinhart | 350/150 |
| 3,837,728 | 9/1974 | Logan et al. | 350/96 WG |

OTHER PUBLICATIONS

Ulrich et al., "Geometrical Optics in Thin Film", *Applied Optics*, vol. 10, No. 9, Sept. 1971, pp. 2077-2085.

*Primary Examiner*—William D. Larkins
*Attorney, Agent, or Firm*—Merriam, Marshall, Shapiro & Klose

[57] ABSTRACT

Method and apparatus for deflecting and modulating a beam of coherent radiation wherein an electric potential is applied across the electrodes of an MOS semiconductor device to vary the thickness and hence conductivity of the depletion layer therein. Incident radiation being propagated through the semiconductor, or alternatively through the depletion layer itself, is deflected and/or modulated as the thickness of the depletion layer is varied.

7 Claims, 4 Drawing Figures

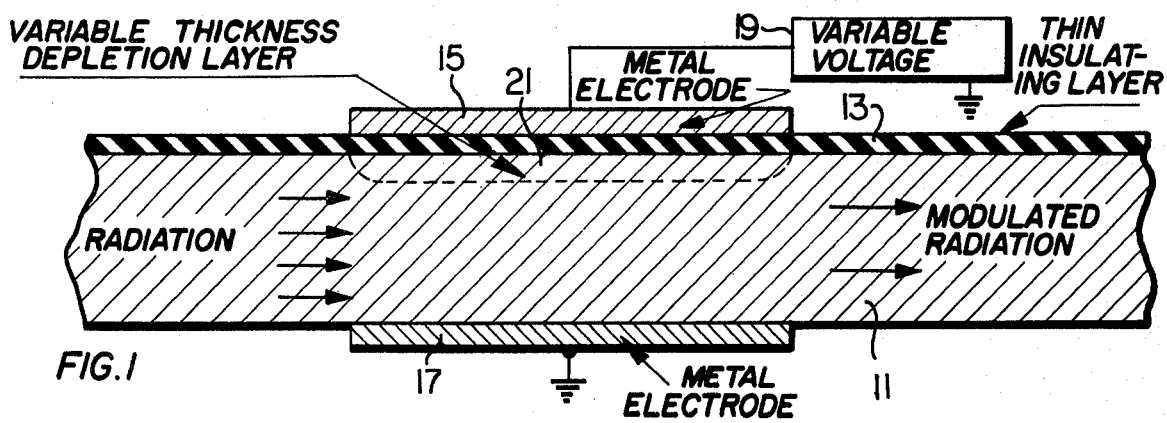
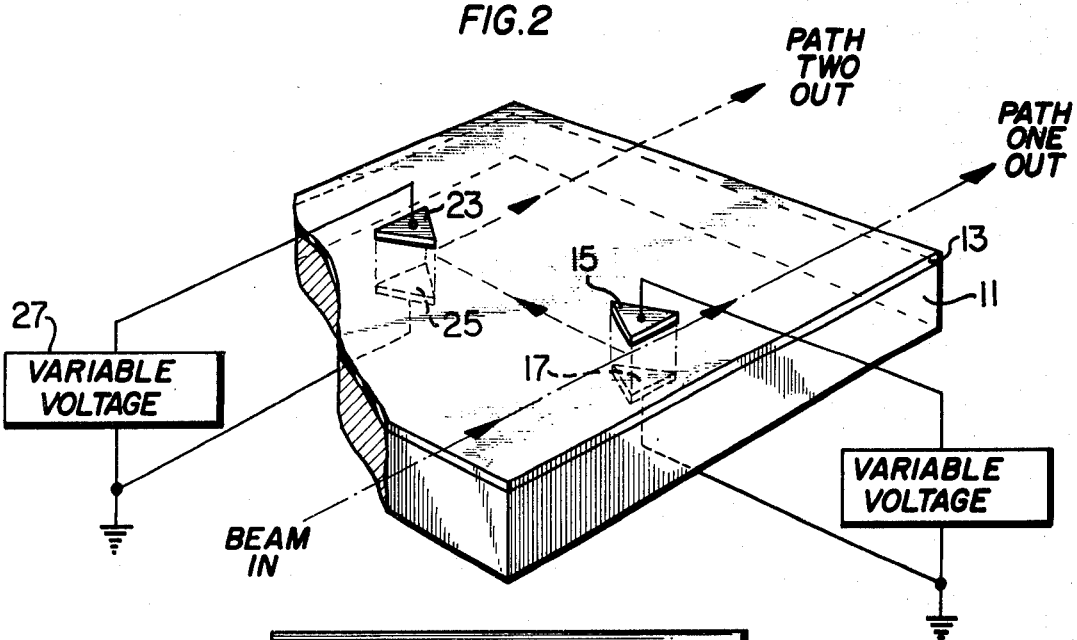
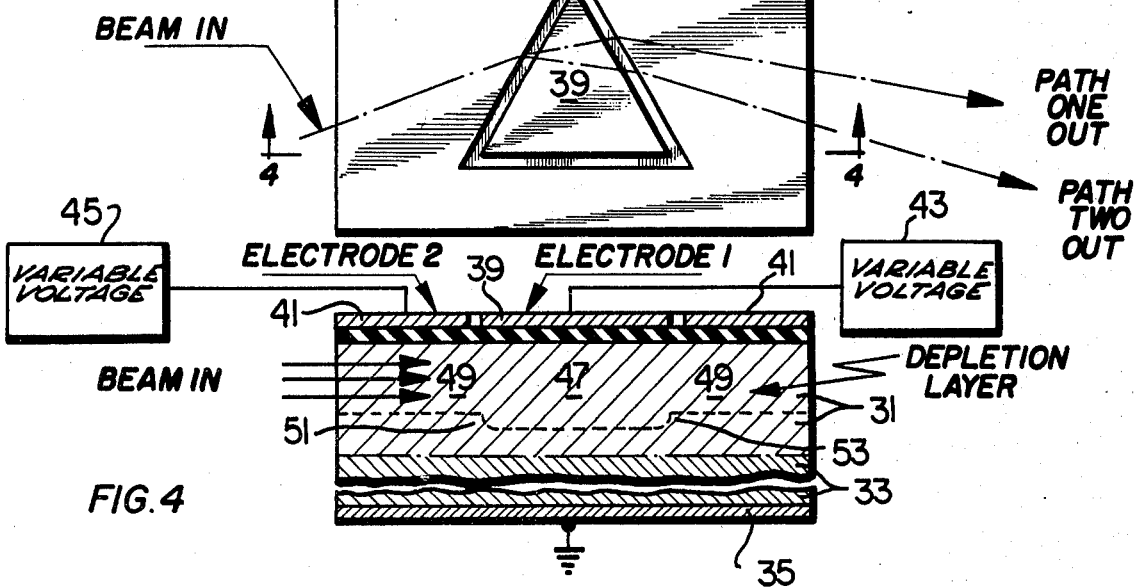

DEPLETION LAYER LASER BEAM MODULATOR AND DEFLECTOR

BACKGROUND OF THE INVENTION

The present invention relates to methods and apparatus for modulating and/or deflecting an incident beam of coherent radiation in the optical or infrared range at very high frequency rates in a semiconductor device.

Reference may be made to the following U.S. Pat. Nos. 3,331,036; 2,836,652; 3,736,045; 3,126,485; 3,102,201; 3,624,406; and 3,586,872.

The adaptation of thin film light guides for computer read-out techniques in data processing and communication systems is considered to be highly desirable by those in the data processing and communication industries. It is basic, therefore, that practical and economical means must be provided for deflecting incident light beams of coherent radiation in the visible and infrared ranges as well as for modulating these so-called "light" beams without removing the beam from the thin film light guide.

In their paper entitled "Geometrical Optics in Thin Film Light Guides", published September, 1971, in Applied Optics, Vol. 10, No. 9 at p. 2077, R. Ulrich and R. J. Martin demonstrated that an incident light beam being transmitted or propagated through a thin film light guide can be reflected or deflected in accordance with Snell's Law.

In their experiments, a thin film light guide comprising a thin, transparent optical material having a high refractive index was sandwiched between a supportive substrate and another layer of optical material, each having a lower refractive index than the thin film. The cross section of the film used was non-uniform in thickness, having a uniform thickness throughout a first portion or region of the film and a greater but uniform thickness in a second region thereof. The two regions of the film were joined at a common boundary where the film was tapered smoothly from the first region to the second region.

Ulrich and Martin showed that a guided light beam having an initial direction obliquely incident on the boundary between the two regions of different thickness in the thin film light guide traversed the tapered region along a curved path and proceeded again in a straight path only upon existing the tapered boundary and entering the second region, the angle of exit being different with respect to the boundary than the angle of incidence. It was found that this phenomenon obeys Snell's Law:

$$N' \sin \theta' = N'' \sin \theta''$$

where $N'$ is the effective refractive index in the first region, $N''$ is the refractive index in the second region, $\theta'$ is the angle of incidence and $\theta''$ is the angle of exit, i.e., angle of refraction.

Accordingly, it has been found possible to form "lenses" and "prisms" in thin film light guides by varying the thickness of the film deposited on a substrate to modify the phase velocity of light traveling through the device so that it is deflected.

If the angle of the beam's incidence exceeds the critical angle, $\theta_c$, and the beam is directed to the boundary through the second region (of greater thickness), however, the beam is totally reflected from the tapered boudary back into the second region in accordance with the geometrical optical law:

$$\theta_r = \pi - \theta_i$$

where $\theta_i$ is the angle of incidence of the incident radiation and $\theta_r$ is the angle of reflection of the reflected radiation.

The application of thin film light guides such as those described above to read-out techniques is limited, however, since a fixed pre-determined ratio exists between the refractive index of the first region and the index of the second region corresponding to the ratio of their respective thicknesses. These characteristics are determined at manufacture and cannot be changed thereafter.

Another method of beam deflection and modulation is suggested by J. H. McFee, R. E. Nahory, M. A. Pollack and R. A. Logan in their paper entitled "Beam Deflection and Amplitude Modulation of 10.6-$\mu$m Guided Waves by Free-carrier Injection in GaAs-AlGaAs Heterostructures" published Nov. 15, 1973 in Appl. Phys. Lett., Vol 23, No. 10 at p. 571. There, it was suggested that free-carrier injection could be utilized for effective amplitude and deflection modulation of 10.6-$\mu$m guided waves in GaAs-AlGaAs heterostructures by addition of a suitable AlGaAs contacting layer to make a double heterostructure for electrically injecting the carriers into the GaAs-AlGaAs heterostructure.

SUMMARY OF THE INVENTION

The method and apparatus of the present invention employs a MOS semiconductor device having a variable thickness depletion layer. In modulating and deflecting a beam of incident radiation, apparatus is provided for applying an electric potential across the semiconductor to establish a depletion layer therein. The beam of incident radiation is coupled into the semiconductor for transmission therethrough while the electric potential is selectively varied to thereby correspondingly vary the thickness of the depletion layer to selectively attenuate the incident radiation beam.

In another embodiment, which is also useful for modulating the incident radiation, apparatus is provided for deflecting the beam of incident radiation in accordance with another method of the present invention. The apparatus comprises means for applying a first electric potential across a first portion of the semiconductor to establish a first depletion layer having a thickness representative of the first electric potential. A second electric potential is applied across a second portion of the semiconductor adjacent the first portion to establish a second depletion layer of a second thickness immediately adjacent the first depletion layer. The beam of incident radiation is coupled into the first depletion layer at an oblique angle with respect to the junction of the first depletion layer and the second depletion layer. By selectively varying the first electric potential and/or the second electric potential, the ratio between the thickness of the first depletion layer and the second depletion layer can be selectively varied so that the incident radiation beam is deflected. The voltage required to produce the requisite changes in the depletion layer thickness is in the order of 20 volts d.c.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

FIG. 1 is a sectional side elevational view of a MOS semiconductor device having a variable depletion layer for modulating an incident radiation beam in accordance with one aspect of the present invention;

FIG. 2 is a sectioned perspective view of a MOS semiconductor device of the type shown in FIG. 1 but having two electrode pairs aligned to deflect and thereby modulate an incident beam of radiation obliquely incident on one of the electrode pairs;

FIG. 3 is a top elevational view of a variable depletion layer MOS semiconductor device for deflecting incident radiation in accordance with another aspect of the present invention; and FIG. 4 is a side elevational view of a section taken along lines 4—4 in FIG. 3.

DETAILED DESCRIPTION

Referring now to FIG. 1, there is shown and described method and apparatus in accordance with the present invention for modulating, at very high frequencies (e.g., greater than 1.0 GHz.), a beam of coherent radiation having a wavelength in the visible or the infrared range.

In the embodiment shown therein, the apparatus includes a MOS semiconductor device comprising a thin layer of semiconductor material 11, such as silicon, having a thin insulating film 13 deposited thereon. If the semiconductor material is silicon, the film 13 should be an oxide of silicon, such as silicon oxide or silicon dioxide, silicon nitride, or any other material having a thickness of approximately 1000 Angstroms. A pair of metal electrodes, 15 and 17, are disposed in aligned relationship on opposite sides of the semiconductor layer 11. The bottom electrode 17 is coupled directly to ground while the corresponding top electrode 15 is coupled to a controlled variable voltage means 19 which is also referenced to ground potential. The controlled variable voltage means 19 applies a differential electric potential in the range of, for example, 20 volts d.c. across the electrode pair to produce a depletion layer, identified generally at 21, in the semiconductor layer 11.

The thickness of the depletion layer 21 is dependent on and proportional to the magnitude of the differential electric potential applied across the electrodes. Thus, the magnitude and sign of the space charge in the region of the semiconductor layer 11 immediately below the variable thickness depletion layer 21 is also dependent on the voltage applied across the electrode pair of the MOS semiconductor device. In particular, the region between the electrodes 15 and 17 is precisely doped, for example, by implantation techniques, so that in the absence of a potential differential across the electrodes, the conductivity of the region between the electrodes is higher than the intrinsic conductivity of the semiconductor layer 11. As a differential potential is applied across the electrodes, however, the thickness of the depletion layer 21 increases, decreasing the conductivity of the region between the electrodes toward the intrinsic level of the semiconductor material. Accordingly, the conductivity of the semiconductor material 11 in the region between the electrodes, 15 and 17, can be modulated by selectively varying the output voltage coupled to electrode 15 from the controlled variable voltage means 19.

Operationally, the incident beam of coherent radiation is externally guided into (and subsequently out of) the thin semiconductor layer 11 in a manner well known in the art so that the radiation is propagated or transmitted through the MOS semiconductor device in a direction normal to the front edge of the variable thickness depletion layer 21. The incident radiation beam is confined to the semiconductor layer 11 due to the high conductivity of the metal electrodes 15 and 17 on either side thereof.

As the incident radiation is propagated through the semiconductor layer 11, it interacts with the electrons in the semiconductor material and is thereby attenuated so that the radiation output from the MOS semiconductor device is substantially attenuated with respect to the incident radiation.

Modulation of the incident radiation beam is effected by selectively varying the output potential from the controlled variable voltage means 19 to correspondingly vary the voltage differential impressed across the electrode pair and hence the conductivity of the semiconductor 11 in the region of the depletion layer 21. Thus, as the thickness of the depletion layer 21 is increased responsive to an increased voltage differential across the electrodes, 15 and 17, the conductivity in the depletion layer region is decreased to a level approaching the intrinsic level of the semiconductor material so that the incident radiation is not attenuated to the degree that it is when the depletion layer is thinner or non-existent. That is, when the depletion layer thickness is maximized, the attenuation of the incident radiation in that region is minimized so that the level of radiation output from the MOS device is maximized. Conversely, when the depletion layer thickness is thinner, attenuation of the incident radiation beam therein is increased and the radiation output from the semiconductor layer 11 decreases.

Accordingly, it will be understood that by selectively varying the electric potential across the electrodes 15 and 17 of the MOS semiconductor device to correspondingly vary the thickness of the depletion layer, the incident radiation beam is modulated in a corresponding manner.

Although any of several semiconductor materials can be utilized, the technology involved in creating a variable thickness depletion layer in silicon is well know. Other semiconductors could also be used, but thus far the technology required is not as well developed as it is for silicon. In the visible light range, cadmium sulfide, zinc sulfide or some other high band-gap transparent semiconductor might be used. For mechanical strength, the device may comprise a layer of silicon of the desired doping grown epitaxially on highly-doped silicon.

The incident beam of coherent radiation can be provided by a laser producing radiation at infrared wavelengths greater than the absorption edge of silicon, where silicon is used. As previously stated, the technique for coupling radiation such as that emitted by a laser into and out of the semiconductor material 11 is well known, requiring that the minimum thickness of the semiconductor layer 11 be roughly one-half of the wavelength of the radiation of the medium.

One adaptation of the method and apparatus described in connection with FIG. 1 is shown in FIG. 2. There, the electrodes 15 and 17 disposed in aligned relationship on opposite sides of the MOs semiconductor device are triangular or prism-shaped. As in FIG. 1, a controlled variable voltage means 19, referenced to ground potential, is coupled to the top electrode 15 with the bottom electrode 17 being referenced to ground potential. The voltage applied to electrode 15 produces a differential electric potential across the electrodes 15 and 17 which can be selectively varied to correspondingly vary the thickness of the depletion layer induced between electrodes 15 and 17.

As illustrated in FIG. 2, the radiation beam introduced into the semiconductor layer 11 of the MOS device is obliquely incident on the prism-shaped region in the semiconductor between electrodes 15 and 17. The difference in conductivity between the semiconductor layer 11 and the depletion layer region between electrodes 15 and 17 results in deflection of the incident beam from the junction of the semiconductor layer 11 and the depletion layer region. Accordingly, by selectively varying the output potential from the controlled variable voltage means 19 coupled to electrode 15 to correspondingly vary the depletion layer thickness and hence the region's conductivity, the incident radiation beam can be deflected. Thus, whereas the incident radiation follows the path out of the MOS semiconductor device designated "Path One Out" in FIG. 1 when the variable depletion layer is less than a certain thickness, the radiation may be deflected therefrom when the depletion layer is thicker. The deflector apparatus shown in FIG. 2 may also be used as a modulator by detecting the intensity of the radiation along Path One Out.

As also shown in FIG. 2, a second pair of electrodes 23 and 25 may be positioned in the path of the incident beam reflected from the first set of electrodes, 15 and 17, to further reflect the reflected beam in a desired direction, e.g., along "Path Two Out". The thickness of the depletion layer between the second pair of electrodes, 23 and 25, and hence the conductivity in the region therebetween, is controlled by differential electric potential provided across electrodes 23 and 25 by a controlled variable voltage means 27 coupled thereacross and referenced to ground. Thus, an incident radiation beam can be directed to a variety of destinations depending on the voltages applied to the respective electrodes of the MOS semiconductor device.

With reference now to FIGS. 3 and 4, there is hereinafter shown and described an alternative apparatus and method for modulating and deflecting an incident beam of coherent radiation wherein the radiation is propagated through a MOS semiconductor device entirely within a variable thickness depletion layer.

The MOS semiconductor device comprises a layer 31 of semiconductor material, such as silicon, having a high conductivity which is epitaxially grown on a substrate 33 (e.g., silicon). A metal electrode 35 coupled to reference ground potential is provided at the bottom of the substrate 33. A thin, insulating layer 37 comprising a material such as silicon oxide, silicon dioxide, or silicon nitride is deposited on the top surface of the device adjacent the epitaxial layer 31.

A pair of electrodes, 39 and 41, are provided at the top surface of the device and are coupled to corresponding controlled variable voltage means 43 and 45, respectively, referenced to ground. As may be most clearly seen in FIG. 3, electrode 39 may take the shape, for example, of a triangle or prism while electrode 41 covers the remaining surface area of the device. Electrodes 39 and 41 are physically separated by a narrow gap along their junction to provide electrical isolation therebetween. Accordingly, the respective thicknesses of the depletion layers, 47 and 49, induced between electrodes 39 and 41 and their common bottom electrode 35 is dependent upon the voltages applied to electrodes 39 and 41 by their corresponding controlled voltage means 43 and 45, respectively. Thus, the thickness of the depletion layer 47 in the region under electrode 39 is independent of the thickness of the depletion layer 49 under electrode 41.

In operation, an incident beam of coherent radiation is externally introduced directly into the depletion layer 49 under electrode 41 at an oblique angle with reference to the junction, identified generally at 51, between the depletion layers 47 and 49. The radiation is confined to the depletion layers by the high conductivities of electrodes 39 and 41 and the epitaxially grown semiconductor layer 31.

As previously stated, it is well known that the phase velocity of a beam of radiation in a thin film guide depends on the film thickness and that in passing between two regions of different thickness the beam is deflected as required by Snell's Law. A similar analysis holds for radiation being propagated through the depletion layers of the MOS semiconductor device shown in FIGS. 3 and 4. Consequently, if the incident radiation beam is transmitted through one depletion region into another, where the thickness of each region can be electronically controlled independently of each other, the beam can be deflected in a controlled manner.

Accordingly, by selectively varying the respective thicknesses of the depletion layers 47 and 49, and hence their respective conductivities, a desired ratio can be selectively established therebetween to determine the angle at which the incident radiation beam is deflected upon passing into the second depletion layer region 49 from the first region 47 (FIG. 3).

Similarly, upon passing from the second depletion layer region 49 back into the first region 47, the light beam is also deflected at junction 53 in accordance with Snell's Law. Therefore, it is apparent that the particular electrode arrangement shown in FIG. 3 causes the incident radiation to be deflected much the same as light into an ordinary optical prism is deflected. It will be understood that other electrode configurations may be used to simulate lenses and the like.

Since a wide range of bending angles are possible, by varying the electrode configurations and/or the voltages applied thereto, an incident radiation beam may exit the MOS semiconductor device along any of many different paths. Thus, not only can an incident beam be deflected in a desired direction by selectively adjusting the variable voltages applied to the first and second electrodes, but the radiation output from the device along any particular output path (e.g., Path One Out or Path Two Out) is modulated.

Accordingly, there has been shown and described novel method and apparatus whereby an incident beam of coherent radiation is modulated and/or deflected at very high frequencies by transmitting the radiation beam through a MOS semiconductor device having a variable thickness depletion layer(s). The voltage required to effectively vary the thickness of the depletion layer is in the order of ten volts, and thus the beam modulator and deflector of the present invention is especially well suited for use in data processing and communication systems.

It should also be understood that mode modulations or elimination can be accomplished by controlling the thickness of the depletion layer through voltage variation. Each mode in thin film optics requires a minimum thickness, therefore, the thickness can be driven too thin to support a particular mode and all lower-order modes.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

What is claimed is:

1. A method for deflecting a beam of radiation in a semiconductor device having a body of semiconductor material, conductive means being provided over said body but being separated therefrom by insulating means, said method comprising:

applying a first electric potential between said semiconductor body and first portion of said conductive means to establish in the semiconductor body adjacent said first portion a first surface depletion layer of a first thickness, applying a second electric potential between said semiconductor body and a second portion of said conductive means to establish in the semiconductor body adjacent said second portion a second surface depletion layer of a second thickness, said first and second portions being adjacent so that said second surface depletion layer is immediately adjacent said first surface depletion layer and forms a junction therewith, the difference in thickness between the first surface depletion layer and the second surface depletion layer resulting in a thickness discontinuity at the junction; and coupling beam of incident radiation directly into the first surface depletion layer of the semiconductor device, the radiation beam traveling through the first surface depletion layer at an oblique angle with respect to the junction of the first surface depletion layer and the second depletion layer so that the radiation beam is deflected in the second surface depletion layer relative to the direction of travel of the radiation beam in the first surface depletion layer, the relative thickness discontinuity determining the angle at which the radiation beam is deflected at the junction.

2. A method in accordance with claim 2 including selectively varying one or both of the first electric potential and the second electric potential to correspondingly vary the thickness discontinuity at the junction and the angle at which the radiation beam is deflected.

3. A method in accordance with claim 2 including monitoring for the deflected radiation beam along an output path, the selective deflection of the incident beam causing the radiation beam output along the output path to be frequency modulated to correspond to variations in the thickness discontinuity.

4. Apparatus for deflecting a beam of radiation in a semiconductor device having a body of semiconductor material, conductive means being provided over said body but being seperated therefrom by insulating means, comprising:

a semiconductor device having a body of semiconductor material, conductive means being provided over said body but being separated therefrom by insulating means, means for applying a first electric potential between said semiconductor body and a first portion of said conductive means to establish in the semiconductor body adjacent said first portion a first surface depletion layer of a first thickness, means for applying a second electric potential between said semiconductor body and a second portion of said conductive means to establish in the semiconductor body adjacent said second portion a second surface depletion layer of a second thickness, said first and second portion being adjacent so that said second surface depletion layer is immediately adjacent said first surface depletion layer and forms a junction therewith, the difference in thickness between the first surface depletion layer and the second surface depletion layer resulting in a thickness discontinuity at the junction; and means for coupling the beam of radiation directly into the first surface depletion layer of the semiconductor device, the radiation beam traveling through the first surface depletion layer at an oblique angle with respect to the junction of the first surface depletion layer and the second surface depletion layer to deflect the incident radiation beam in the second surface depletion layer relative to the direction of travel of the radiation beam in the first surface depletion layer, the relative thickness discontinuity determining the angle at which the radiation beam is deflected at the junction.

5. Apparatus in accordance with claim 4 wherein means are initially provided to increase the conductivity of the first and second surface depletion layers above the intrinsic conductivity of the semiconductor.

6. Apparatus in accordance with claim 4 including means for selectively varying one or both of the first electric potential and the second electric potential to correspondingly vary the thickness discontinuity at the junction and the angle at which the radiation beam is deflected.

7. Apparatus in accordance with claim 6 including means for monitoring for the deflected radiation beam along an output path, the output of the monitoring means being frequency modulated according to the selective deflection of the radiation beam from the output path responsive to variations in the thickness discontinuity.

* * * * *

UNITED STATES PATENT AND TRADEMARK OFFICE
CERTIFICATE OF CORRECTION

PATENT NO. : 3,970,364
DATED : July 20, 1976
INVENTOR(S) : Robert Gerson & Robert J. Bell It is certified that error appears in the above-identified patent and that said Letters Patent are hereby corrected as shown below:

Column 1, line 48, "existing" should be --exiting--;
          line 67, "boudary" should be --boundary--;
Column 2, line 42, "moduiating" should be --modulating--;
          line 58, "thickness" should be --thicknesses--;
Column 5, line 1, "MOs" should be --MOS--;
Column 7, line 1, "modulations" should be --modulation--;
          line 39, "coupling beam" should be --coupling a beam--

Signed and Sealed this

First Day of February 1977

[SEAL]

Attest:

RUTH C. MASON
*Attesting Officer*

C. MARSHALL DANN
*Commissioner of Patents and Trademarks*